(12) United States Patent
Yoshida (10) Patent No.: US 6,173,123 B1
(45) Date of Patent: Jan. 9, 2001

(54) RANGEFINDER APPARATUS

(76) Inventor: Hideo Yoshida, 324, Uetake-cho 1-chome, Omiya-shi, Saitama 330-8624 (JP)

( * ) Notice: Under 35 U.S.C. 154(b), the term of this patent shall be extended for 0 days.

(21) Appl. No.: 09/396,378

(22) Filed: Sep. 15, 1999

(30) Foreign Application Priority Data

Sep. 22, 1998 (JP) .................................................. 10-268138

(51) Int. Cl.⁷ .............................. G03B 13/36; G01C 3/08
(52) U.S. Cl. ......................... 396/106; 396/120; 396/129; 356/3.04
(58) Field of Search .................................... 396/106, 120, 396/301, 129; 356/3.04, 3.05; 250/201.4, 201.6

(56) References Cited

U.S. PATENT DOCUMENTS 5,832,324 * 11/1998 Shimizu et al. .................. 396/106 X

FOREIGN PATENT DOCUMENTS 7-181038   7/1995 (JP) .
7-229735   8/1995 (JP) .

* cited by examiner

Primary Examiner—W. B. Perkey (57) ABSTRACT

A rangefinder apparatus includes an infrared light-emitting diode for projecting light toward a range-finding object; a position sensitive device for detecting projected light reflected from the range-finding object and outputting a signal according to a position at which the reflected light is detected; and arithmetic circuit for carrying out an arithmetic operation according to the signal from the photosensitive device and outputting a signal corresponding to a distance to the range-finding object; an integrating circuit for integrating the signal from the arithmetic circuit by repeatedly discharging an integrating capacitor with an integrating period in response to the signal from the arithmetic circuit, to output a signal corresponding to a result of the integration produced by charging the integrating capacitor; a CPU for detecting the distance to the range-finding object according to the signal from the integrating circuit; a battery for supplying a power source voltage; and a step-up regulator for raising the power source voltage of the battery through an oscillating action and outputting the raised voltage to the position sensitive device, arithmetic circuit, and the like, wherein the integrating period of the integrating circuit is prevented from being a constant period.

2 Claims, 9 Drawing Sheets

RANGEFINDER APPARATUS

BACKGROUND OF THE INVENTION

1. Field of the Invention

The present invention relates to a rangefinder apparatus used in a camera or the like.

2. Related Background Art

In an autofocus mechanism (AF mechanism) of a camera or the like, a rangefinder apparatus for measuring the distance to an object by a trigonometric system is used in general. In this rangefinder apparatus, a light-emitting device projects an infrared ray toward the object, a light-receiving device receives reflected light of the ray and outputs a signal according to a position at which the light is received, and a signal processing circuit or the like measures the distance to the object according to this signal.

In the rangefinder apparatus, since a predetermined power source voltage is necessary for actuating the signal processing circuit and the like, the voltage of the battery contained in the camera is raised by a step-up regulator, and thus raised voltage is supplied to the signal processing circuit and the like.

SUMMARY OF THE INVENTION

However, the above-mentioned rangefinder apparatus has a problem that it may fail to obtain accurate range-finding results.

Therefore, it is an object of the present invention to resolve this problem and provide a range finder apparatus which can carry out accurate range-finding.

In order to achieve this object, the rangefinder apparatus in accordance with one aspect of the present invention comprises light-emitting means for projecting a ray toward a range-finding object; light-receiving means for receiving reflected light of the ray projected from the light-emitting means to the range-finding object and outputting a signal according to a position at which the light is received; arithmetic means for carrying out an arithmetic operation according to the signal from the light-receiving means and outputting a signal corresponding to a distance to the range-finding object; integrating means for integrating the signal from the arithmetic means by discharging or charging an integrating capacitor a plurality of times with a predetermined period in response to the signal from the arithmetic means, so as to output a signal corresponding to a result of the integration; detecting means for detecting the distance to the range-finding object according to the signal from the integrating means; a battery for supplying a power source voltage; and step-up means for raising the power source voltage of the battery through an oscillating action and outputting thus raised voltage; wherein the raised voltage is supplied to at least one of the light-emitting means, light-receiving means, arithmetic means, integrating means, and detecting means; and wherein the predetermined period of the integrating means is kept from being a constant period.

The rangefinder apparatus in accordance with another aspect of the present invention comprises light-emitting means for projecting a ray toward a range-finding object; light-receiving means for receiving reflected light of the ray projected from the light-emitting means to the range-finding object and outputting a signal according to a position at which the light is received; arithmetic means for carrying out an arithmetic operation according to the signal from the light-receiving means and outputting a signal corresponding to a distance to the range-finding object; integrating means for integrating the signal from the arithmetic means by discharging or charging an integrating capacitor a plurality of times with a predetermined period in response to the signal from the arithmetic means, so as to output a signal corresponding to a result of the integration; detecting means for detecting the distance to the range-finding object according to the signal from the integrating means; a battery for supplying a power source voltage; and step-up means for raising the power source voltage of the battery through an oscillating action and outputting thus raised voltage; wherein the raised voltage is supplied to at least one of the light-emitting means, light-receiving means, arithmetic means, integrating means, and detecting means; and wherein the predetermined period of the integrating means is asynchronous to an oscillating period of the step-up means.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

In the following, embodiments of the present invention will be explained with reference to the accompanying drawings. Constituents identical to each other among the drawings will be referred to with numerals or letters identical to each other without their overlapping explanations repeated. Also, dimensional ratios in the drawings do not always match those explained.

First Embodiment

Figure 1:
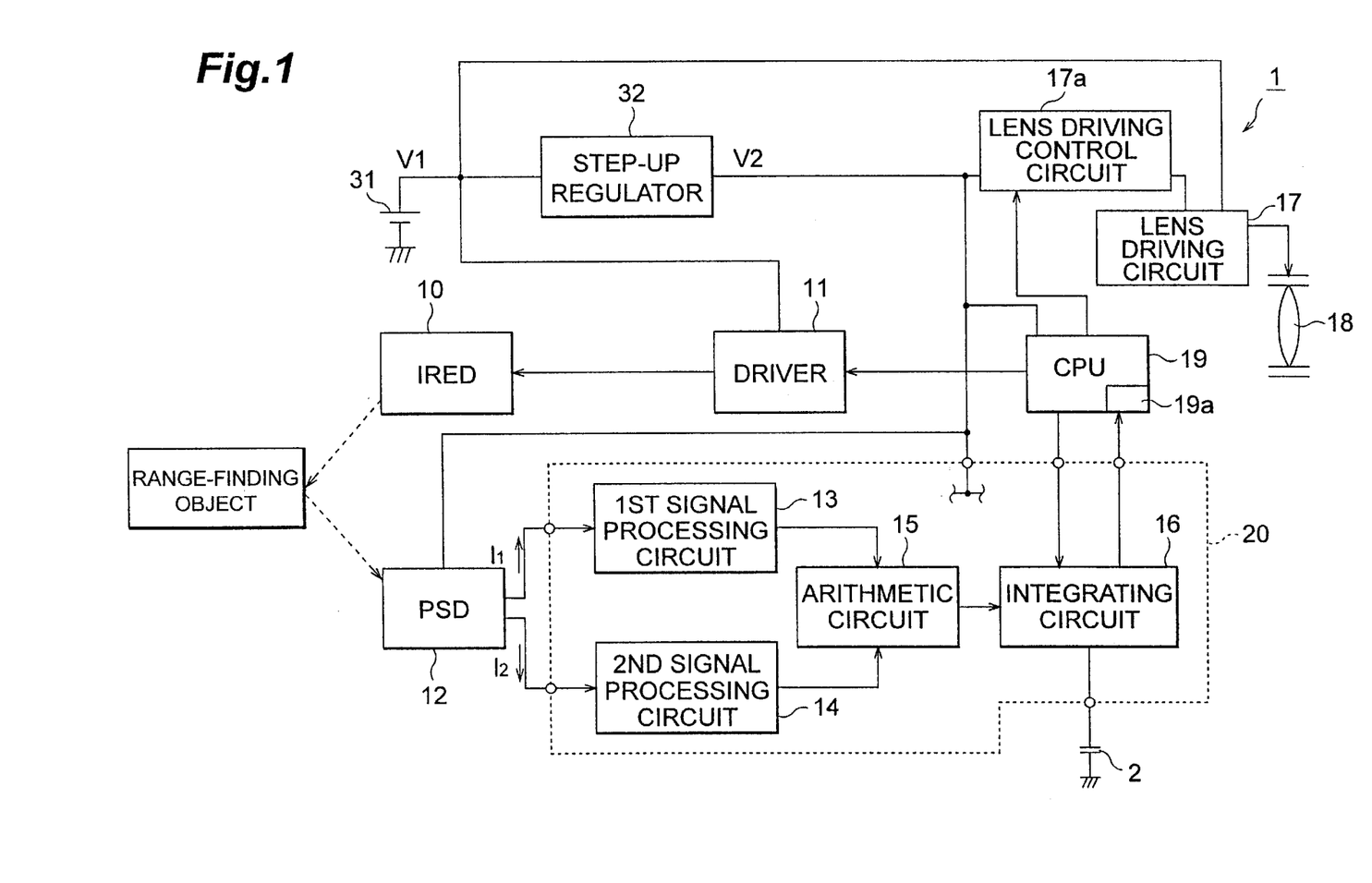
FIG. 1 is an explanatory view of the rangefinder apparatus in accordance with a first embodiment.

FIG. 1 shows the schematic configuration of the rangefinder apparatus in accordance with this embodiment.

The rangefinder apparatus 1 in accordance with this embodiment is used in an autofocus type camera, and comprises, as shown in FIG. 1, an infrared light-emitting diode (hereinafter referred to as "IRED") 10 and a position sensing device (hereinafter referred to as "PSD") 12. The IRED 10 emits light, by way of an action of a driver 11, according to a control signal of a microcomputer (hereinafter referred to as "CPU") 19. The PSD 12 is a light-receiving means which receives the infrared ray emitted from the IRED 10 and then reflected by an object. Employed as the PSD 12, for example, is a photodiode which outputs currents as being distributed between two electrodes according to the position where the infrared ray is received.

Also, the rangefinder apparatus 1 is provided with an autofocus integrated circuit (hereinafter referred to as "AFIC") 20. The AFIC 20 is a circuit which outputs, according to the signal current outputted from the PSD 12, a distance signal corresponding to the distance to the object. The AFIC 20 comprises a first signal processing circuit 13, a second signal processing circuit 14, an arithmetic circuit 15, and an integrating circuit 16. The first signal processing circuit 13 and the second signal processing circuit 14 process signal currents $I_1$ and $I_2$ outputted from the PSD 12, respectively. According to the respective signals outputted from the signal processing circuits 13 and 14, the arithmetic circuit 15 computes and outputs the information concerning the distance to the object.

The integrating circuit 16 integrates the output from the arithmetic circuit 15. Since errors may occur in the rangefinding relied on a single light-emitting operation of the IRED 10, a plurality of light-emitting operations are carried out, so as to yield a plurality of items of distance information, and these plurality of distance information items are integrated by the integrating circuit 16, so as to output thus integrated information as distance data.

The rangefinder apparatus 1 is provided with a CPU 19. The CPU 19 controls the whole rangefinder apparatus 1. The CPU 19 is provided with a unit 19a that detects, according to the output from the AFIC 20, the distance to the object. The CPU 19 controls a lens driving circuit 17 so as to move a photographic lens 18 to an in-focus position. Also, the rangefinder apparatus 1 is provided with a battery 31. The battery 31 is used for supplying a power source voltage to various components of the rangefinder apparatus 1. Employed as the battery 31, for example, is a battery contained in a camera. The output voltage V1 of the battery 31 is supplied to the driver 11 and is used as the power source voltage therefor.

A step-up regulator 32 is connected to the battery 31. The step-up regulator 32 receives the output voltage V1 of the battery 31 and outputs a raised voltage V2 which is higher than the output voltage V1. Employed as the step-up regulator 32 is a switching regulator having an oscillating circuit therewithin. The raised voltage V2 outputted from the step-up regulator 32 is supplied to the PSD 12, a lens driving control circuit 17a, the CPU 19, and the AFIC 20, so as to be used as the power source voltage for each component.

The integrating circuit will now be explained in detail.

Figure 2:
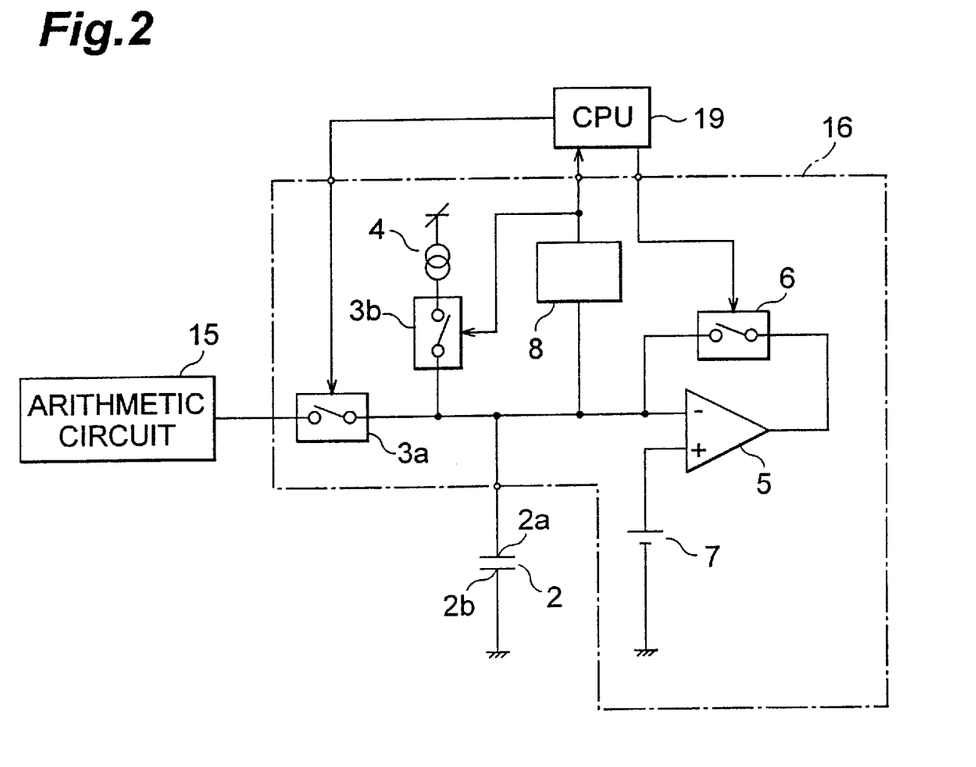
FIG. 2 is an explanatory view of an integrating circuit.

FIG. 2 shows the electric configuration of the integrating circuit 16. As shown in FIG. 2, the integrating circuit 16 is equipped with a switch 3a which is connected to an output terminal of the arithmetic circuit 15. Connected to the other end of the switch 3a is an external integrating capacitor 2. Also connected to the other end of the switch 3a are a constant current source 4, by way of a switch 3b, and an operational amplifier 5 for charging the integrating capacitor 2. Connected to the "−" input terminal of the operational amplifier 5 is one end of a switch 6, whereas the output terminal of the operational amplifier 5 is connected to the other end of the switch 6. A reference power source 7 is connected to the "+" input terminal of the operational amplifier 5. The switches 3a, 3b, and 6 are controlled by the CPU 19.

Figure 3:
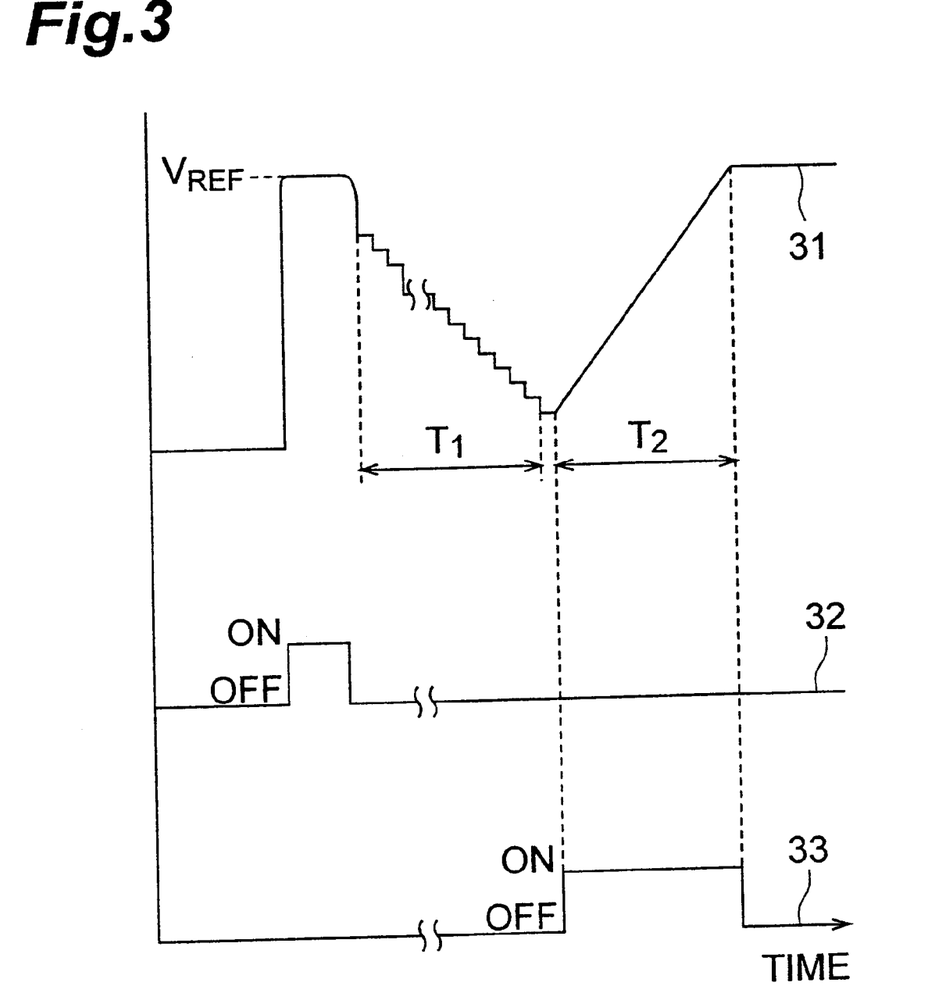
FIG. 3 is an explanatory chart of an action of the integrating circuit.

FIG. 3 is an explanatory chart of an operation of the integrating circuit, showing an integrating capacitor control signal 31, a switch 6 control signal 32, and a switch 3b control signal 33.

In the integrating circuit 16, when the main power for the camera is turned on, and the release button is "half-pushed," then a control signal from the CPU 19 turns on the switch 6, so as to charge the integrating capacitor 2. Consequently, as schematically shown in FIG. 3, the integrating capacitor 2 is charged until it attains a reference voltage ($V_{REF}$) given by the reference power source 7. After the charging, the switch 6 is turned off and held in this state.

Thereafter, an infrared ray is emitted from the IRED 10 in a pulsing fashion, and the switch 3a is turned on/off in synchronization with a time which is about half the light-emitting width thereof. As a result, the respective outputs from the arithmetic circuit 15 corresponding to the individual infrared light emissions are successively fed into the integrating capacitor 2. The outputs from the arithmetic circuit 15 are fed into the integrating capacitor 2 as negative voltages, whereby, as shown in FIG. 3, the charging voltage of the integrating capacitor 2 is reduced stepwise by the amount of voltage corresponding to a distance (first integration $T_1$).

After the negative voltages are inputted (discharge) by a predetermined number of (e.g., 256) pulse emissions, the switch 3b is turned on by a control signal of the CPU 19. As a consequence, the integrating capacitor 2 is charged at a constant speed determined by the rating of the constant current source 4 (second integration $T_2$). When the voltage of the integrating capacitor 2 returns to the reference voltage ($V_{REF}$) upon this charging, the CPU 19 turns off the switch 3b, thereby stopping the charging of the integrating capacitor 2.

A terminal 2a of the integrating capacitor 2 is connected to the CPU 19 by way of a comparator 8, and the CPU 19 can carry out measurement only during the time when the comparator output is HIGH, thus being able to measure the time required for the second integration. Since the charging speed is constant due to the constant current source 4, the sum of signal voltages fed into the integrating capacitor 2 in a single range-finding operation, i.e., the distance to the object, can be determined from the time $T_2$ required for the second integration.

Thereafter, in the case where the release button is completely pushed, the CPU 19 controls the lens driving circuit 17 according to the determined distance, thereby causing the taking lens 18 to carry out an appropriate focusing action.

Control signals of the CPU 19 will now be explained in detail.

Figure 4:
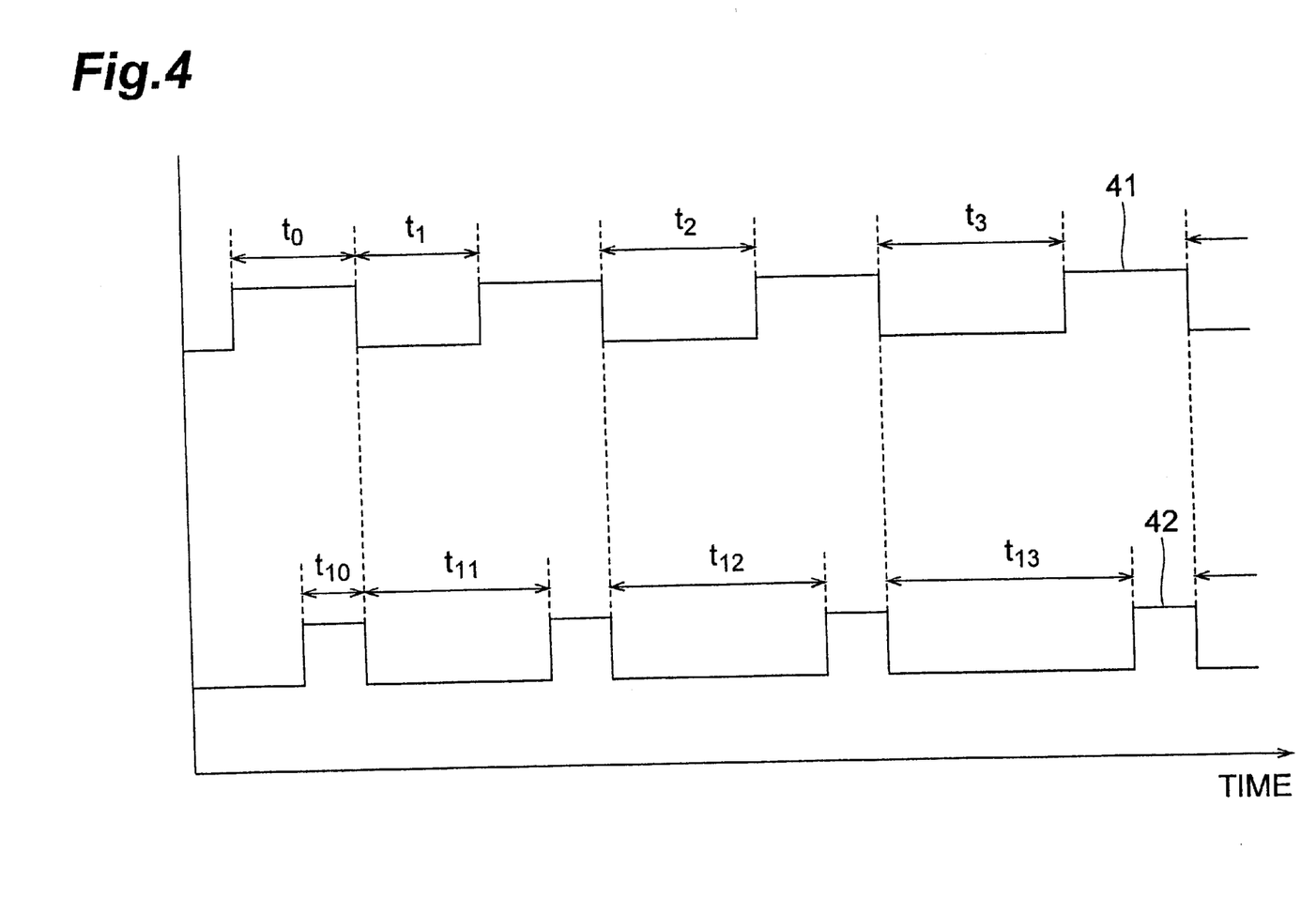
FIG. 4 is a chart showing the control signal 41 outputted from the CPU 19 to the driver 1, the control signal 42 outputted from the CPU 19 to the integrating circuit 16.

FIG. 4 is a chart showing the control signal 41 outputted from the CPU 19 to the driver 11, the control signal 42 outputted from the CPU 19 to the integrating circuit 16. In FIG. 4, the ordinate and abscissa indicate voltage and time. As shown, the control signal 41, pulses are continuously fed into the driver 11, and the driver 11 is actuated in response thereto, so that the IRED 10 emits light in a pulsing fashion. As a consequence, the IRED 10 emits light a plurality of times with predetermined periods, whereas the light-emitting periods are not a constant period. For example, each light-emitting time t0 is set to a constant time, whereas extinction times t1, t2, t3, . . . between the light-emitting times t0 are set to times different from each other, so as to keep the light-emitting periods of the IRED 10 from becoming constant.

Also, as shown, the control signal 42, the integration (discharge) of the integrating capacitor 2 is effected a plurality of times with predetermined periods, whereas the integrating periods are not a constant period. For example, the integrating periods are synchronized with the light-emitting periods of the IRED 10, each integrating time t10 is set to a constant time, and non-integrating times t11, t12, t13, . . . between the integrating times t10 are set to times different from each other, so as to keep the integrating periods from becoming constant.

Here, "constant period" means that the time from when the integrating capacitor 2 starts an integration to when it starts the next integration is always constant, or the time from when the IRED 10 starts a light emission to when it starts the next light emission is always constant. As a consequence, "not a constant period" also includes a case where, for example, a reference non-integrating time (reference time) is set in the control signal of the integrating capacitor 2, a predetermined time is sequentially added to or subtracted from the reference time every time an integration is carried out, so as to yield a non-integrating time, and the non-integrating time is returned to the reference time after a predetermined number of integrating operations are carried out.

When the integrating periods of the integrating capacitor 2 are thus kept from being constant, the integrating periods and the oscillating period of the step-up regulator 32 can be prevented from being synchronized with each other. As a consequence, even in the case where a ripple is generated as a noise in the raised voltage outputted by the step-up regulator 32, whereby the output signal of the PSD 12, first signal processing circuit 13, or second signal processing circuit fluctuates or generates a noise in the output thereof under the influence of the ripple, influences exerted on the range-finding results are reduced, thus enabling accurate range-finding.

Specific range-finding results obtained by the rangefinder apparatus 1 will now be explained.

Figure 5A:
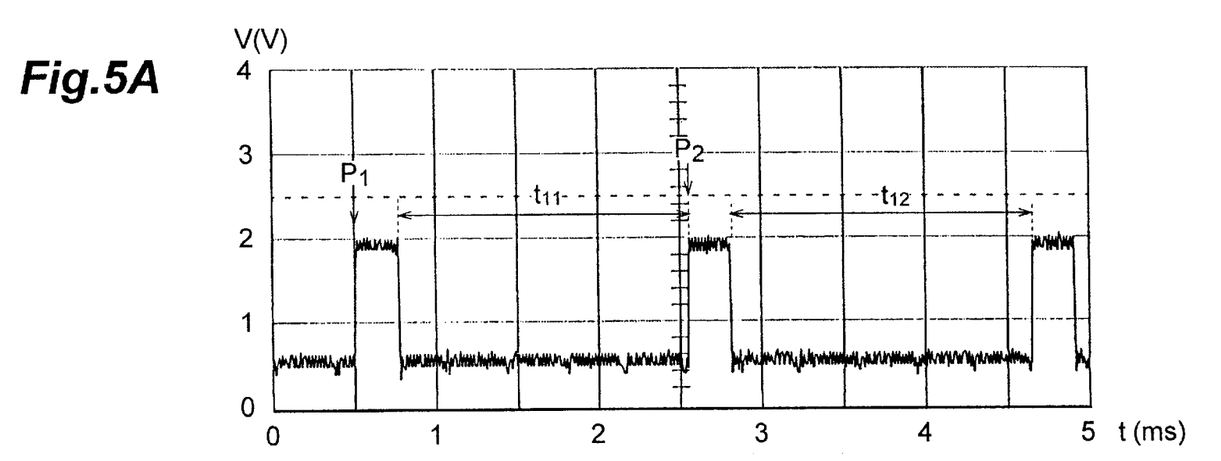
FIG. 5A is a chart showing an input signal to the integrating circuit 16 in the rangefinder apparatus 1 in accordance with the above-mentioned embodiment.
Figure 5B:
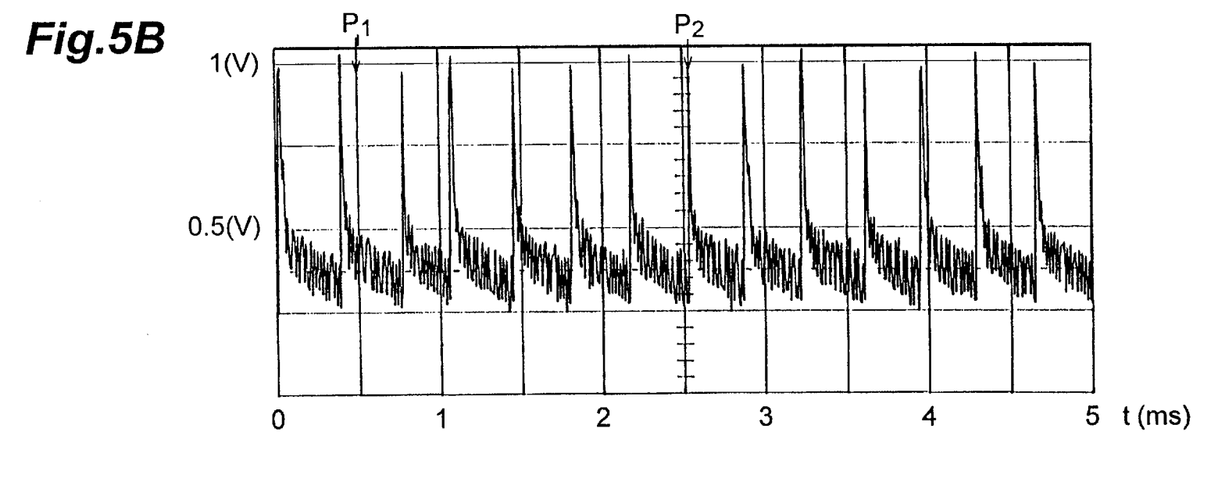
FIG. 5B is a chart showing an output voltage of a step-up regulator 32 in the rangefinder apparatus 1 in accordance with the above-mentioned embodiment.
Figure 6A:
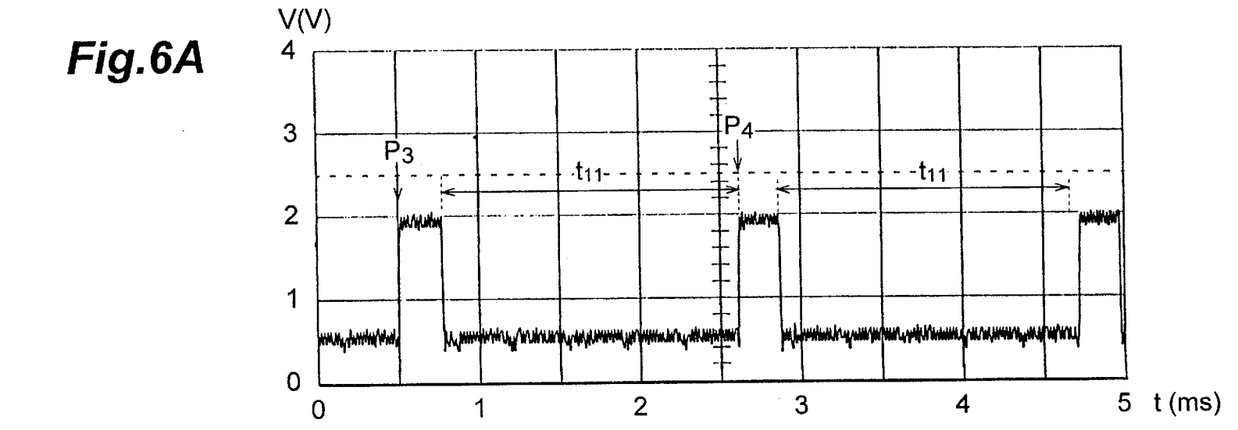
FIG. 6A is a chart showing an input signal to an integrating circuit in a rangefinder apparatus on which the rangefinder apparatus 1 in accordance with the above-mentioned embodiment is based.
Figure 6B:
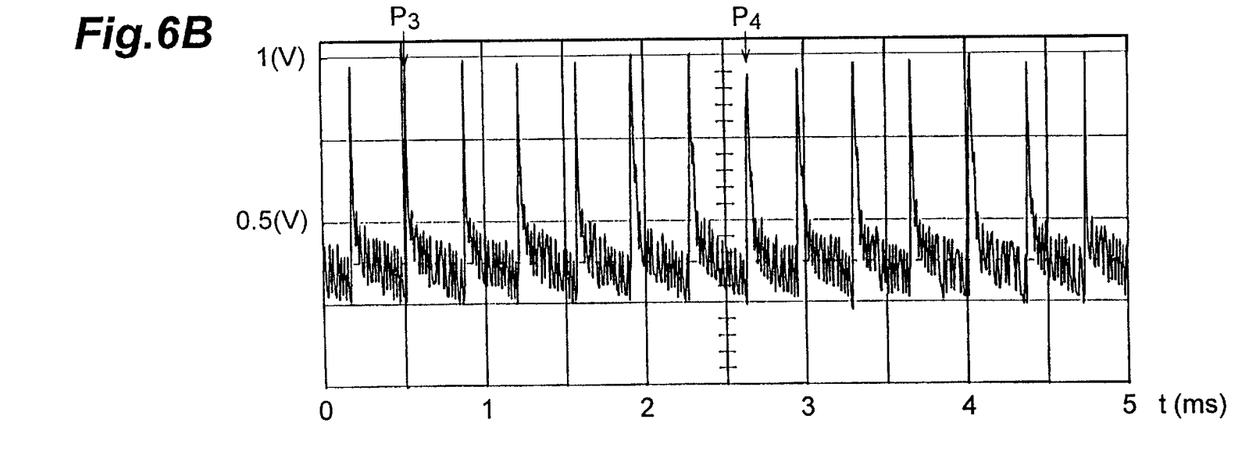
FIG. 6B is a chart showing an output voltage of a step-up regulator in the rangefinder apparatus on which the rangefinder apparatus 1 in accordance with the above-mentioned embodiment is based.

FIG. 5A is a chart showing an input signal to the integrating circuit 16 in the rangefinder apparatus 1 in accordance with this embodiment, whereas FIG. 5B is a chart showing an output voltage of the step-up regulator 32 in the rangefinder apparatus 1 in accordance with this embodiment. FIG. 6A is a chart showing an input signal to an integrating circuit in a rangefinder apparatus on which the rangefinder apparatus 1 in accordance with the above-mentioned embodiment is based, whereas FIG. 6B is a chart showing an output voltage of a step-up regulator in the rangefinder apparatus on which the rangefinder apparatus 1 in accordance with the above-mentioned embodiment is based. In each of FIGS. 5A, 5B, 6A, and 6B, the abscissa indicates time, 0.1 ms per scale. In each of FIGS. 5A and 6A, the ordinate indicates voltage value, 0.2 V per scale. In each of FIGS. 5B and 6B, the ordinate indicates the voltage value of AC component, 50 mV per scale. Here, times $P_1$ to $P_4$ in one chart correspond to those in the other charts.

In the output voltage of the step-up regulator 32 in the rangefinder apparatus 1 in accordance with this embodiment, as shown in FIG. 5B, a ripple corresponding to its oscillating period is generated, whereby the voltage fluctuates with a substantially constant period. In FIG. 5A, on the other hand, the non-integrating time (time in which the pulse waveform is LOW) of the range finder apparatus 1 is set such that, with the reference time being 340 $\mu$s, the non-integrating time is increased by 4 $\mu$s every time when integrated until it reaches 368 $\mu$s, at which it is returned to 340 $\mu$s again. As a consequence, the oscillating period of the step-up regulator 32 and the integrating period of the integrating capacitor 2 are not synchronized with each other.

As shown in FIG. 6B, a ripple is also generated in the output voltage of the step-up regulator, according to its oscillating period, in the rangefinder apparatus on which the rangefinder apparatus 1 in accordance with this embodiment is based. In FIG. 6A, on the other hand, the non-integrating time (time in which the pulse waveform is LOW) of the rangefinder apparatus is fixedly set to 354 $\mu$s. As a consequence, a period which is six times the oscillating period is in synchronization with the integrating period of the integrating capacitor 2.

Figure 7:
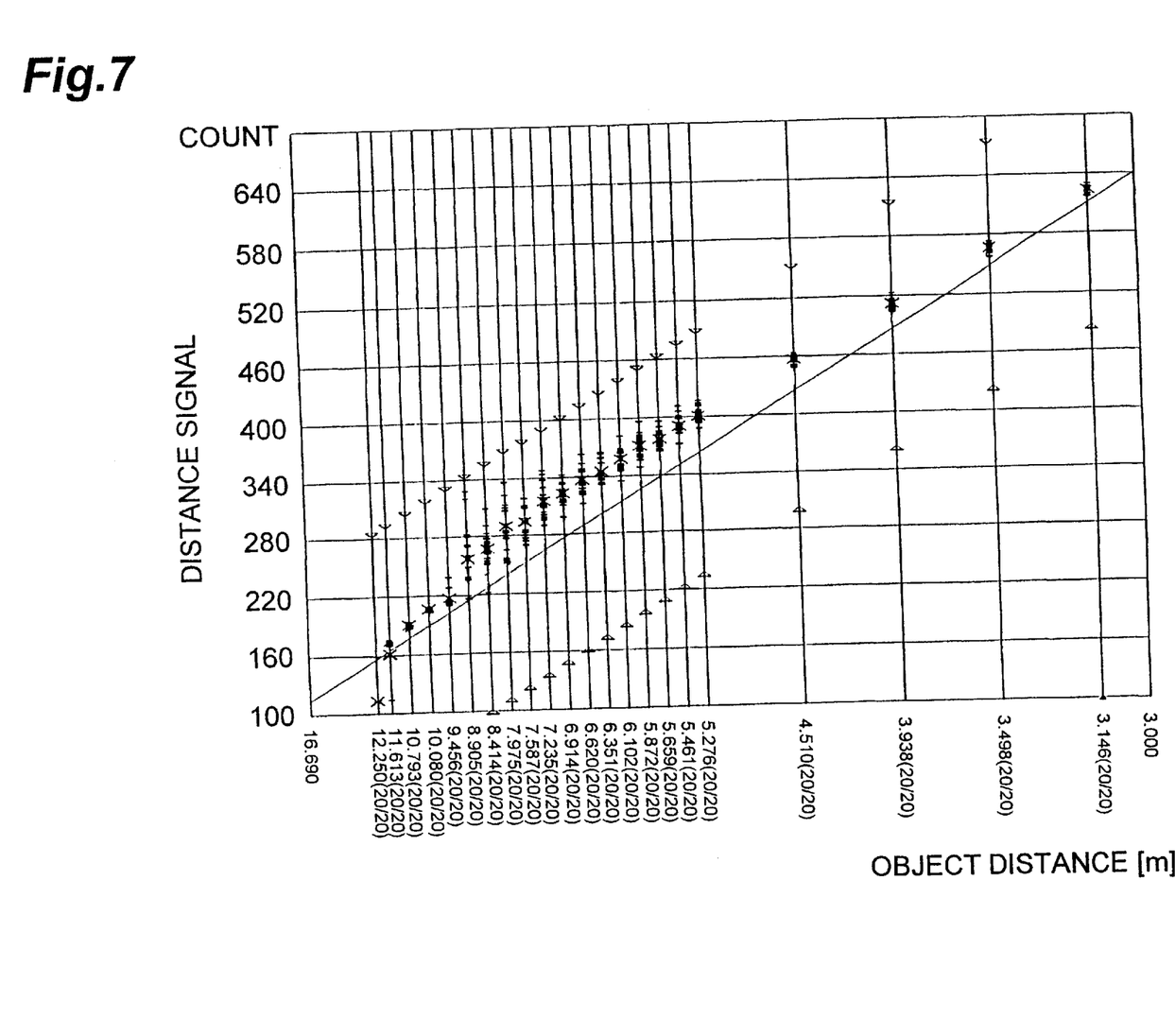
FIG. 7 is a chart showing range-finding results of the rangefinder apparatus in accordance with the first embodiment.
Figure 8:
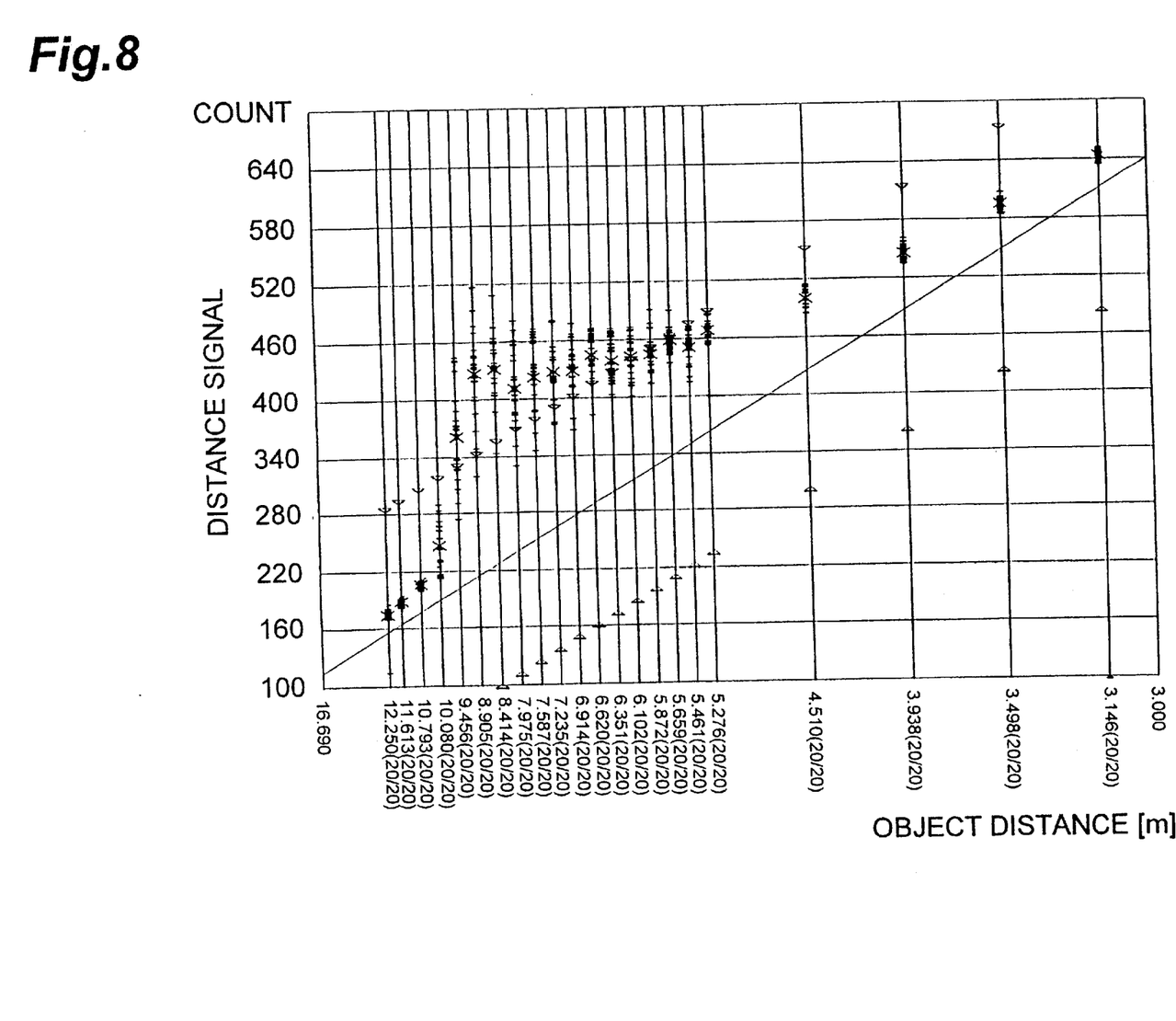
FIG. 8 is a chart showing range-finding results of the rangefinder apparatus on which the present invention is based.

FIG. 7 shows range-finding results of the rangefinder apparatus 1 in accordance with this embodiment. FIG. 8 shows range-finding results of the rangefinder apparatus on which the rangefinder apparatus 1 in accordance with this embodiment is based. The range-finding results in FIGS. 7 and 8 are those obtained when range-finding operations were carried out 20 times for each distance while the distance to the object was changed stepwise. In each of FIGS. 7 and 8, the ordinate indicates the value of distance signal obtained as being computed by the CPU, whereas the abscissa indicates the distance to the object. Also, in each of FIGS. 7 and 8, the solid line, symbol X, downward triangle, and upward triangle indicate the designed value (theoretical value), average value of 20 range-finding operations at each distance, permissible upper limit at each distance, and permissible lower limit at each distance, respectively.

In the rangefinder apparatus 1 in accordance with this embodiment, as shown in FIG. 7, the distance signal obtained by range-finding was a value between the permissible upper and lower limits at each distance, whereby data substantially similar to the designed value were obtained as the distance signal. In the rangefinder apparatus on which the rangefinder apparatus 1 is based, by contrast, as shown in FIG. 8, the distance signal was measured greater at each distance and, in particular, it became a value greater than the permissible upper limit at longer distances, thus failing to yield a distance signal corresponding to the distance to the object, whereby it was impossible to carry out accurate range-finding.

As explained in the foregoing, since the integrating periods of the integrating circuit 16 are kept from being a constant period, the rangefinder apparatus 1 in accordance with this embodiment can prevent, when a ripple is generated in the raised voltage outputted from the step-up regulator 32, the period of the ripple and the period of integration from being synchronized with each other. As a consequence, the ripple in the raised voltage can be made less influential in the range-finding results, whereby accurate range-finding can be carried out.

The present invention is also applicable to the case where the charging/discharging operations are the reverse of those in the above-mentioned embodiment, i.e., in an integrating circuit in which a plurality of charging operations are carried out so as to increase the charging voltage stepwise and then only a single discharging operation is effected.

The distance to the object is obtained on the basis of the time needed in the second integral, while it may also be obtained on the basis of the result of the A/D conversion of the integral voltage value obtained by the first integral, namely, the voltage value which is reduced due to the discharge of integral capacitor or the voltage value which is increased due to the charge of integral capacitor.

Though the raised voltage V2 of the step-up regulator 32 is supplied to the PSD 12, AFIC 20, CPU 19, and the lens driving control circuit 17a in this embodiment, the present invention is also applicable to such a case where a step-down regulator is disposed downstream the step-up regulator 32, so that the output voltage of the step-down regulator is supplied to the PSD 12 and the like. In this case, the voltage in which the regulator ripple is reduced by the step-down regulator can be supplied to individual electronic components such as PSD 12.

Though this embodiment relates to the case where the rangefinder apparatus in accordance with the present invention is applied to an autofocus type camera, the rangefinder apparatus in accordance with the present invention is not limited thereto and may be employed in others such as video camera as long as they have a range-finding function.

Second Embodiment

Though the rangefinder apparatus 1 in accordance with the first embodiment changes the non-integrating time so as to keep the integrating period from being constant, the rangefinder apparatus in accordance with the present invention is not limited thereto and may make the integrating period asynchronous to the oscillating period of the step-up regulator 32.

Figure 9:
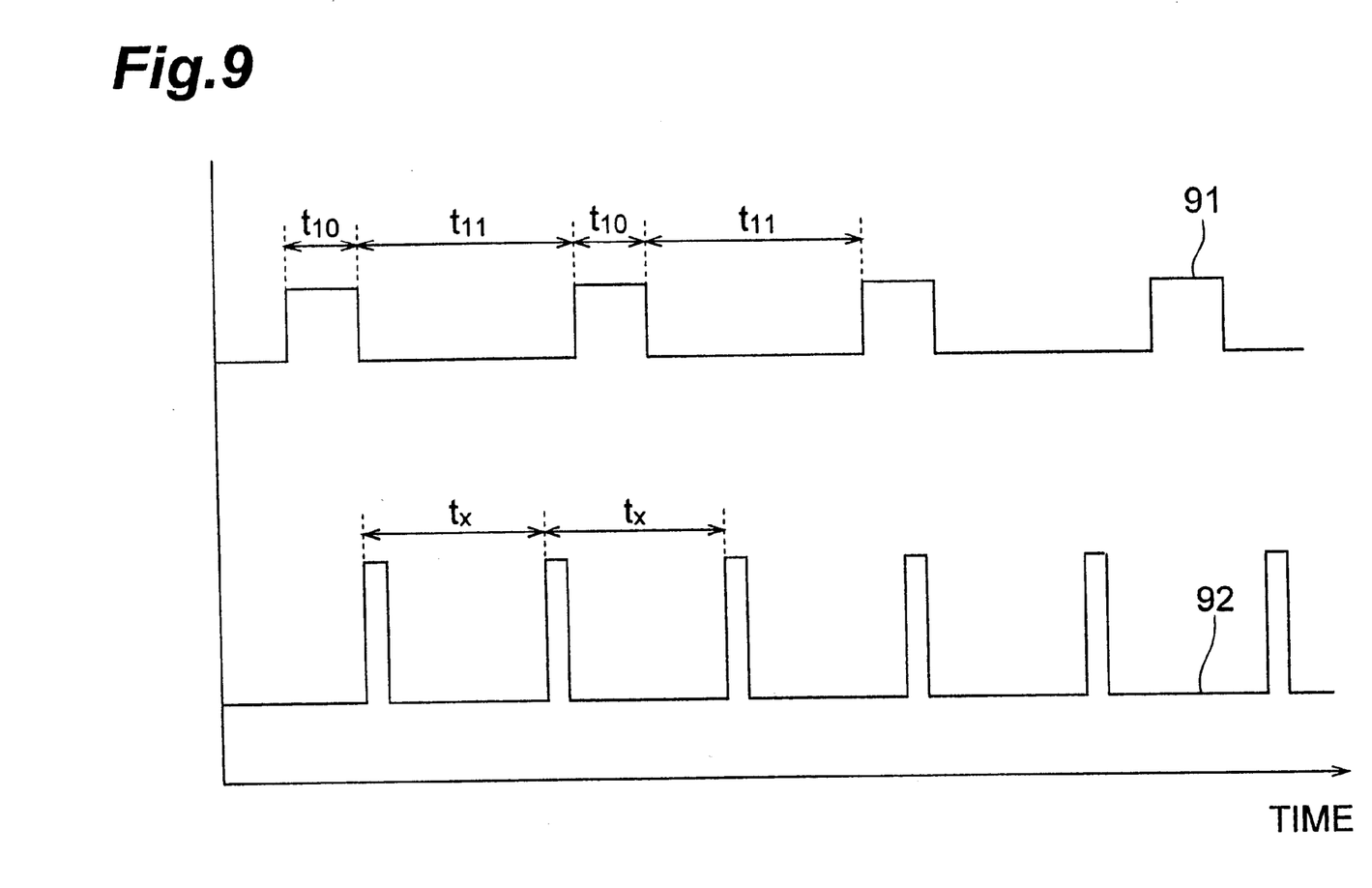
FIG. 9 is an explanatory chart of the rangefinder apparatus in accordance with a second embodiment.

FIG. 9 is an explanatory chart of the rangefinder apparatus in accordance with the second embodiment, showing an integrating capacitor control signal 91 and a step-up regulator control signal 92. For example, letting the integrating period of the integrating capacitor 2 be t10+t11, and the oscillating period of the step-up regulator 32 be tx, the integrating period t10+t11 of the integrating capacitor 2 is caused to satisfy the relationships of the following expressions (1) and (2) with respect to the oscillating period tx of the step-up regulator 32:

$$n \cdot tx \neq t10+t11 \quad (1)$$

$$tx \neq n \cdot (t10+t11) \quad (2)$$

where n is an integer.

Since the integrating period of the integrating capacitor 2 is thus kept from being synchronized with the oscillating period of the step-up regulator 32, even in the case where a ripple is generated as a noise in the raised voltage outputted from the step-up regulator 32, whereby the output signal of the PSD 12, first signal processing circuit 13, or second signal processing circuit 14 fluctuates or generates a noise therein under the influence of the ripple, influences exerted on the range-finding results are reduced as in the rangefinder apparatus 1 in accordance with the first embodiment, thus enabling accurate range-finding.

Also, in the range finder apparatus in accordance with this embodiment, since the integrating period may be left constant, it becomes easy to control the integrating period.

It is particularly effective in the case using a step-up regulator of a type in which, while the oscillating period of the step-up regulator 32 is fixed, its pulse width changes in response to changes in the amount of current supply, i.e., of a fixed frequency type.

As explained in the foregoing, the following effects can be obtained by the present invention.

Namely, it can prevent, when a ripple is generated in the raised voltage outputted from step-up means, the period of ripple and the period of integration from being synchronized with each other. Therefore, the ripple in the raised voltage can be made less influential in range-finding results, thus enabling accurate range-finding.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A rangefinder apparatus comprising:
light-emitting means for projecting light toward a range-finding object;
light-detecting means for detecting reflected light of the light projected from said light-emitting means to the range-finding object and outputting a signal according to a position at which the reflected light is detected;
arithmetic means for carrying out an arithmetic operation according to the signal from said light-detecting means and outputting a signal corresponding to a distance to the range-finding object;
integrating means for integrating the signal from said arithmetic means by discharging or charging an integrating capacitor a plurality of times with a period, in response to the signal from said arithmetic means, to output a signal corresponding to the integration;
detecting means for detecting the distance to the range-finding object according to the signal from said integrating means;
a battery for supplying a power source voltage; and
step-up means for raising the power source voltage of said battery through an oscillating action and outputting a raised voltage wherein the raised voltage is supplied to at least one of said light-emitting means, light-detecting means, arithmetic means, integrating means, and detecting means, and the period of said integrating means is prevented from being a constant period.

2. A rangefinder apparatus comprising:
light-emitting means for projecting light toward a range-finding object;
light-detecting means for detecting reflected light of the light projected from said light-emitting means to the range-finding object and outputting a signal according to a position at which the reflected light is detected;
arithmetic means for carrying out an arithmetic operation according to the signal from said light-detecting means and outputting a signal corresponding to a distance to the range-finding object;
integrating means for integrating the signal from said arithmetic means by discharging or charging an integrating capacitor a plurality of times with a period, in response to the signal from said arithmetic means, to output a signal corresponding to the integration;
detecting means for detecting the distance to the range-finding object according to the signal from said integrating means;
a battery for supplying a power source voltage; and step-up means for raising the power source voltage of said battery through an oscillating action and outputting a raised voltage wherein the raised voltage is supplied to at least one of said light-emitting means, light-detecting means, arithmetic means, integrating means, and detecting means, and the period of said integrating means is asynchronous with an oscillating period of said step-up means.

* * * * *

UNITED STATES PATENT AND TRADEMARK OFFICE
CERTIFICATE OF CORRECTION

PATENT NO.   : 6,173,123 B1
DATED        : January 9, 2001
INVENTOR(S)  : HIDEO YOSHIDA It is certified that an error appears in the above-identified patent and that said Letters Patent is hereby corrected as shown below:

Please insert

--[73] Assignee: Fuji Photo Optical Co., Ltd.--.

Signed and Sealed this

Fifteenth Day of May, 2001

Attest:

NICHOLAS P. GODICI

Attesting Officer

Acting Director of the United States Patent and Trademark Office